United States Patent
SaganeGowda et al.

(10) Patent No.: US 10,403,276 B2
(45) Date of Patent: Sep. 3, 2019

(54) VOICE ENABLED FEATURES BASED ON PROXIMITY

(71) Applicant: Microsoft Technology Licensing, LLC, Redmond, WA (US)

(72) Inventors: Suma SaganeGowda, Redmond, WA (US); Louis Amadio, Sammamish, WA (US); Artem Zhurid, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/462,564

(22) Filed: Mar. 17, 2017

(65) Prior Publication Data

US 2018/0268814 A1 Sep. 20, 2018

(51) Int. Cl.
G10L 15/22 (2006.01)
G10L 15/06 (2013.01)

(52) U.S. Cl.
CPC ............ G10L 15/22 (2013.01); G10L 15/063 (2013.01); *G10L 2015/0635* (2013.01); *G10L 2015/223* (2013.01); *G10L 2015/227* (2013.01); *G10L 2015/228* (2013.01)

(58) Field of Classification Search
None
See application file for complete search history.

(56) References Cited

U.S. PATENT DOCUMENTS

| 5,406,618 | A | 4/1995 | Knuth et al. |
| 5,457,769 | A | 10/1995 | Valley |
| 7,552,055 | B2 * | 6/2009 | Lecoeuche ........ G06F 17/30731 704/255 |
| 8,654,936 | B1 | 2/2014 | Eslambolchi et al. |
| 9,100,694 | B1 | 8/2015 | Chandel et al. |
| 9,196,262 | B2 | 11/2015 | Shen et al. |
| 9,197,736 | B2 * | 11/2015 | Davis .................. G06F 3/04842 |
| 9,282,096 | B2 | 3/2016 | Goldstein |
| 9,384,751 | B2 | 7/2016 | Venkatesha et al. |
| 9,875,081 | B2 * | 1/2018 | Meyers ................. G10L 15/063 |
| 2004/0228456 | A1 * | 11/2004 | Glynn .................... G06Q 10/06 379/88.01 |

(Continued)

FOREIGN PATENT DOCUMENTS

WO 2016057269 A1 4/2016

OTHER PUBLICATIONS

Weise, Elizabeth, "How Voice-Activated Devices Listen To You (and How to Turn Them Off)", http://www.usatoday.com/story/tech/news/2016/03/02/how-voice-activated-devices-listen-you-and-how-turn-them-off/81187578/, Published on: Mar. 2, 2016, 3 pages.

(Continued)

*Primary Examiner* — Neeraj Sharma
(74) *Attorney, Agent, or Firm* — Newport IP, LLC; Han Gim (57) ABSTRACT

Techniques for controlling a voice activated feature of a voice activated device are described. Data from one or more sensors and data indicative of a status of a user are received. Based on the analyzing the data, a proximity of the user relative to the location of the voice activated device is determined. One or more voice activated features of the voice activated device are enabled based at least in part on the determined proximity, one or more rules, and one or more user preferences.

20 Claims, 5 Drawing Sheets

(56) References Cited

U.S. PATENT DOCUMENTS

| | | |
|---|---|---|
| 2005/0275505 A1 | 12/2005 | Himmelstein |
| 2006/0179127 A1* | 8/2006 | Randall ................ H04M 19/04 709/219 |
| 2006/0182242 A1 | 8/2006 | Henry et al. |
| 2012/0245941 A1 | 9/2012 | Cheyer |
| 2015/0228274 A1* | 8/2015 | Leppanen ............... G10L 15/20 704/243 |
| 2015/0340040 A1* | 11/2015 | Mun ....................... G10L 17/22 704/246 |
| 2015/0382047 A1* | 12/2015 | Van Os .................. G06F 16/73 725/38 |
| 2016/0180853 A1* | 6/2016 | VanLund ................ G10L 17/22 704/275 |
| 2016/0246364 A1* | 8/2016 | Miller ..................... G09G 5/00 |
| 2016/0284350 A1 | 9/2016 | Yun et al. |
| 2016/0373269 A1* | 12/2016 | Okubo .................. H04L 12/282 |
| 2017/0110129 A1* | 4/2017 | Gelfenbeyn ............ G10L 25/48 |
| 2017/0229009 A1* | 8/2017 | Foster ................... H04W 4/023 |
| 2017/0289168 A1* | 10/2017 | Bar ...................... H04L 63/0853 |
| 2018/0033430 A1* | 2/2018 | Kawano ................. G10L 15/22 |

OTHER PUBLICATIONS

"International Search Report and Written Opinion Issued in PCT Application No. PCT/US18/021905", dated Jun. 15, 2018, 15 Pages.

* cited by examiner

VOICE ENABLED FEATURES BASED ON PROXIMITY

BACKGROUND

Voice activated or voice command devices are gaining in popularity. Such devices are controlled by the human voice, allowing users to operate the devices without the need to control the device with buttons or keys. The devices typically use some form of speech recognition receive and identify commands.

SUMMARY

Methods and systems for controlling a voice activated feature of a voice activated device are described. Data from one or more data sources indicative of a status of a user are received. Based on analysis of the data, a likely location of the user is selected based on probabilities of a plurality of likely locations. A likely proximity of the user relative to the location of the voice activated device is determined. The proximity may be determined in part based on availability of sensor and computing status information. One or more voice activated features of the voice activated device are enabled based at least in part on the determined proximity, one or more rules, and one or more user preferences.

The features, functions, and advantages can be achieved independently in various embodiments or may be combined in yet other embodiments, further details of which can be seen with reference to the following description and illustrations.

DETAILED DESCRIPTION

This disclosure describes techniques and systems for activating features of a voice activated or voice command device through the use of voice recognition and keyword spotting based on the proximity of a user to the device, in effect acting as a "push to talk" for the voice activated or voice command device. In some cases, a voice activated or voice command device may be activated unintentionally, for example, from voices from a nearby room, a television, or other voice sources that may produce ambient speech. When activated unintentionally, the voice activated or voice command device may cause unwanted actions, such as turning the device on or off, unlocking or locking a door, or even ordering an item from a seller website. Additionally, ambient speech may have less fidelity due to ambient noise and other factors, and thus the voice recognition may be erroneous, leading to processing of incorrect or unintended commands.

In one embodiment of the disclosure, an interconnected network may be coupled to one or more user computing devices as well as data sources such as sensors and computing devices located throughout a home or office environment. At least one of the devices is a voice activated device. The sensors can include luminosity sensors, passive infrared (IR) sensors, cameras with image recognition, depth sensors, and the like. The computing devices can be any other device that may be operable to interact on the interconnected network. Based on the data from the data sources, the voice activated device may make a determination as to a user's position and status relative to the voice activated device. The voice activated device may be configured so that it only responds to voice commands when the user's position and status meets one or more criteria. For example, the voice activated device may only respond to voice commands when a user is detected to be within a specified radius from the voice activated device, such as 3 feet or 5 feet. The distance may correlate to an expected proximity of a user when the user is intending to activate the voice activated device.

In another example, the voice activated device may only respond to voice commands when a user is inferred to be within a specified location based on available presence information. Inference logic may be used to infer the user's presence status from both the user's computing device, other computing devices, and available sensors. Sensor information may include light patterns and movement patterns, and user device information may include Bluetooth connectivity status, computing device activity or non-activity, and the like. The inference logic may execute on a device on a local network such as the voice activated device, or another device in the network.

By linking voice activated functions to the user's presence, a device such as a voice activated thermostat may be configured to operate based on high fidelity voice inputs that are more readily available based on close physical proximity. Far field microphones are typically large and unsuitable for smaller devices that may be desired for home networks. However, near field devices for such smaller devices typically have lower fidelity, and thus the use of proximity to enable voice activation can ensure a higher fidelity activation for such device by disallowing inputs from far field voice sources to activate the device. Additionally, system resource consumption and power consumption may be reduced on various devices of the interconnected network. For example, processes for detecting and recognizing voice inputs may be invoked only when user proximity is determined, therefore avoiding execution of processes and using system resources.

Various sensors and devices may be used to directly or indirectly provide user presence information. For example, passive infrared (IR) devices may be used to detect motion to infer the presence of a user. A camera may provide data and image recognition may be used to determine that a user is within an estimated proximity of the device. Depth sensors along with color sensors can be used to detect how far a user is from the device.

Additionally, the user's presence may be inferred based on secondary or non-direct information. For example, the presence of a user device such as a key fob or a smartphone can be used to infer that the user is within an estimated proximity to the voice activated or voice command device. The presence of the user may be inferred using information such as the Bluetooth connection for the user becoming disconnected, suggesting that the user has left the room and is of a sufficient distance so as to disconnect from the Bluetooth transceiver of the voice activated device. Other secondary information may include, for example, sensors that detect door opening and closing, heat sensors, and self-reported location information from a user's mobile device.

In some embodiments, the voice activated device may be configured with a default set of parameters for when the voice activated features are allowed. Such parameters may include a radius (distance) from the voice activated device, or whether a time period where the voice activation parameters are to be in effect. In some embodiments, the user may be provided the ability to select options for the voice activation parameters. For example, the user may specify the radius based on the location of the voice activated device and the geometry of the room.

In another example, the user may select an option to turn off the voice activation completely, for example if the room will have numerous occupants and the voice activated features should be disabled. In some embodiments, active operations for enabling voice activation features on a voice activated device may be limited to time periods and/or locations based on a profile configured by the user. For example, operations may be limited or disabled during night hours, or at identified locations, such as an outdoor location or garage.

In some embodiments, active operations for enabling voice activation features on a voice activated device may include determining a state of the user's mobile device. The state may, in some examples, refer to a change in the computing device's state of motion associated with a change in the computing device's location over time. The state may be determined by monitoring existing signals of the computing device, and/or location data generated by applications on the computing device. Such existing signals and location data may include signals that indirectly or directly suggest a state of the computing device.

In general, the accuracy of a determined state or location of a user may have an associated uncertainty, and the determined state or location may be assigned a score or metric. The score or metric may quantify a likelihood that the determined or location state represents the actual state or of the computing device.

In an embodiment, the determination of the user's location may be determined using an inferred or deduced set of conditions and a set of rules for enabling voice activation features on a voice activated device. In one embodiment, a set of conditions may be used to determine an estimated location of a user. In response, the set of conditions as well as other information may be collected and analyzed to determine that the voice enabled features should be enabled. One or more rules can be used to make either or both determinations.

In some embodiments, determining that the voice enabled features should be enabled may be determined based on the number of persons in a room or area.

In some embodiments, the voice activated device may provide a notification regarding whether the voice enabled features are allowed and whether a user's presence was detected. The notifications can be stored locally for future reference, sent periodically or at a schedule to the user's device or another device, or a status may be provided on the device itself such as illuminating a light or providing an audio indication.

In some embodiments, the voice activated device may be configured to adapt to the specific behavior patterns of the user. For example, if it is observed that the presence of the user has not been detected during the same time period on a daily basis for several weeks, the voice activated device may require a stronger or weaker indication of presence in order to enable the voice activated features. In some embodiments, the voice activated device, or a function controlling the voice activated features of the device, may be configured to modify conditions and rules for determining the presence of a user based on feedback using aspects of machine learning, thus allowing for the determinations and actions to be improved over time.

In some embodiments, the functionality for enabling voice activated features of a voice activated device may be executed as a function on the voice activated device, another computing device in communication with the voice activated device, or a combination. Additionally, some functionality may execute as a cloud-based service. The voice activated device can be integrated with a home network or other network and configured to obtain data that indicates the status of various sensors and home devices.

Figure 1:
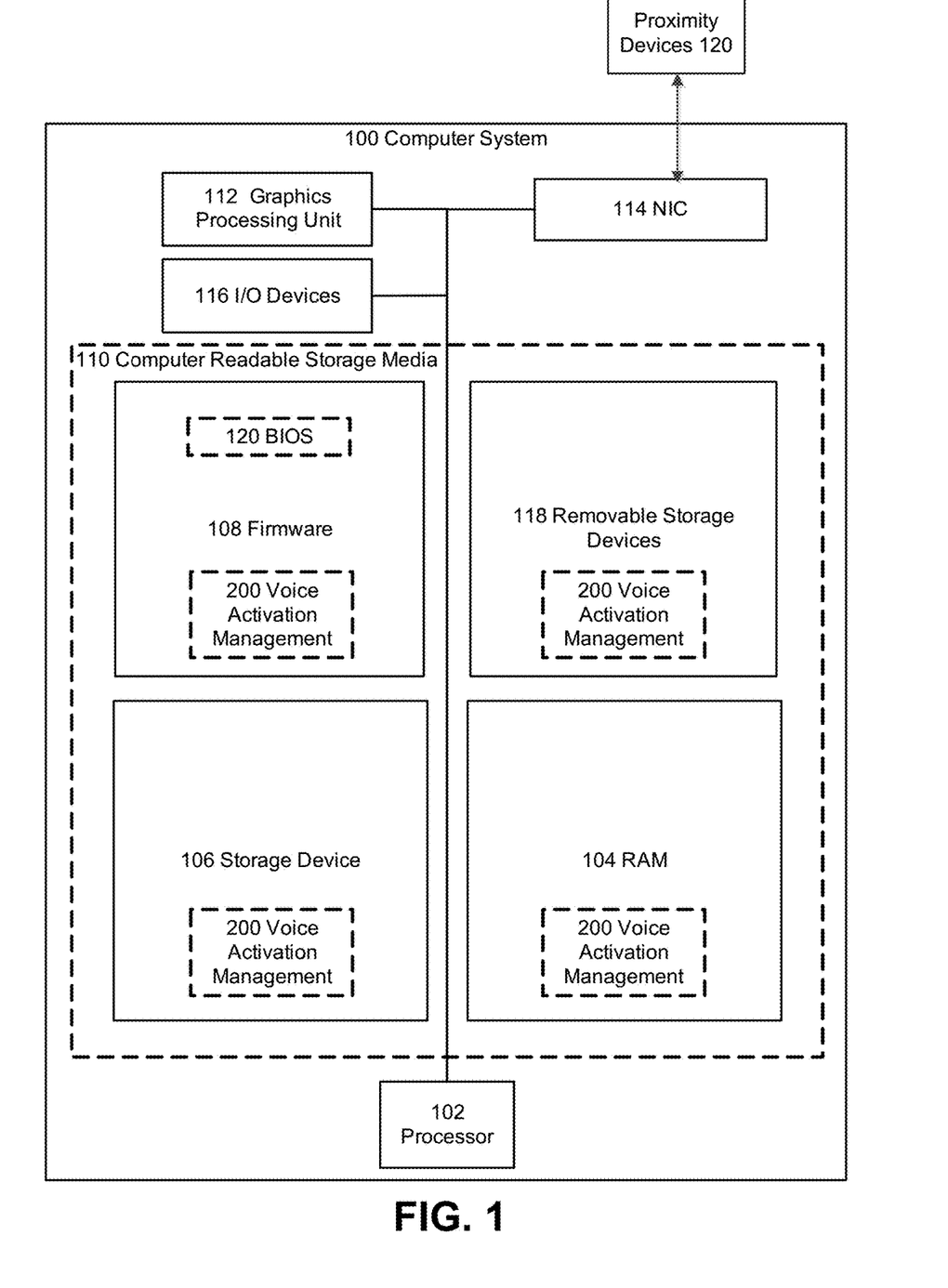
FIG. 1 is a system diagram of an example computer environment, in accordance with an embodiment.

Referring to FIG. 1, an example computing environment in which embodiments of the present disclosure may be implemented is depicted and generally referenced as computing environment 100. As utilized herein, the phrase "computing environment" generally refers to a computing device with processing power and storage memory, which supports operating software that underlies the execution of software, applications, and computer programs thereon.

As shown by FIG. 1, computing environment 100 includes processor 110 (e.g., an execution core) that is interconnected by one or more system buses that couple various system components to processor 110. While one processor 110 is shown in the example depicted by FIG. 1, one skilled in the art will recognize that computing environment 100 may have multiple processors (e.g., multiple execution cores per processor substrate and/or multiple processor substrates each having multiple execution cores) that each receive computer-readable instructions and process them accordingly. The one or more system buses may be any of several types of bus structures including a memory bus or memory controller, a peripheral bus, and a local bus using any of a variety of bus architectures. In an embodiment, computing environment 100 also includes a host adapter, Small Computer System Interface (SCSI) bus, and an external storage device connected to the SCSI bus.

Computing environment 100 also typically includes or has access to various computer-readable media. Computer-readable media is any available media accessible to computing environment 100 that embodies computer-readable, processor-executable instructions. By way of example, and not limitation, computer-readable media includes computer-readable storage media 110 and communication media. Aspects of the present disclosure are implemented by way of computer-readable, processor-executable instructions that are stored on or transmitted across some form of computer-readable media.

Communication media typically embodies computer-readable instructions, data structures, program modules or other data in a modulated data signal such as a carrier wave or other transport mechanism and includes any information delivery media. "Modulated data signal", as used herein, refers to a signal having one or more characteristics that each may be configured or modified to encode data into the signal for propagation through a communication channel. Examples of such communication channels include wired media such as a wired network or direct-wired connection, and wireless media such as acoustic, RF, infrared and other wireless media.

Computer-readable storage media 110 can include, for example, random access memory ("RAM") 104; storage device 106 (e.g., electromechanical hard drive, solid state hard drive, etc.); firmware 108 (e.g., FLASH RAM or ROM); and removable storage devices 118 (e.g. CD-ROMs, floppy disks, DVDs, FLASH drives, external storage devices, etc). It should be appreciated by those skilled in the art that other types of computer-readable storage media can be used such as magnetic cassettes, flash memory cards, and/or digital video disks. Generally, such computer-readable storage media can be used in some embodiments to store processor executable instructions tangibly embodying aspects of the present disclosure. Consequently, computer-readable storage media explicitly excludes signals per se.

Computer-readable storage media 110 can provide non-volatile and/or volatile storage of computer-readable, processor-executable instructions, data structures, program modules and other data for computing environment 100. A basic input/output system ("BIOS") 120, containing the basic routines that help to transfer information between elements within computing environment 100, such as during start up, can be stored in firmware 108. A number of programs may be stored on firmware 108, storage device 106, RAM 104, and/or removable storage devices 118. These programs can include an operating system and/or application programs. In a specific embodiment, computer-readable storage media 110 of a computing environment 100 can store voice activation management system 200, which is described in more detail in the following paragraphs. In this example embodiment, voice activation management system 200 can be executed by processor 110 thereby transforming computing environment 100 into a computer environment configured for a specific purpose, i.e., a computer environment configured according to techniques described in this disclosure.

With continued reference to FIG. 1, commands and information may be received by computing environment 100 through input/output devices ("I/O devices") 116. I/O devices 116 include one or more input devices, output devices, or a combination thereof. Examples of input devices include a keyboard, a pointing device, a touchpad, a touchscreen, a scanner, a microphone, a joystick, and the like. Examples of output devices include a display device, an audio device (e.g. speakers), a printer, and the like. These and other I/O devices are often connected to processor 110 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit.

Computing environment 100 may operate in a networked environment and receive commands and information from one or more remote computers via logical connections to the one or more remote computers, such as a remote computer. The remote computer may be another computer, a server, a router, a network PC, a peer device or other common network node, and typically can include many or all of the elements described above relative to computing environment 100.

When used in a LAN or WAN networking environment, computing environment 100 can be connected to the LAN or WAN through network interface card ("NIC") 114. NIC 114, which may be internal or external, can be connected to the system bus. In a networked environment, program modules depicted relative to computing environment 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
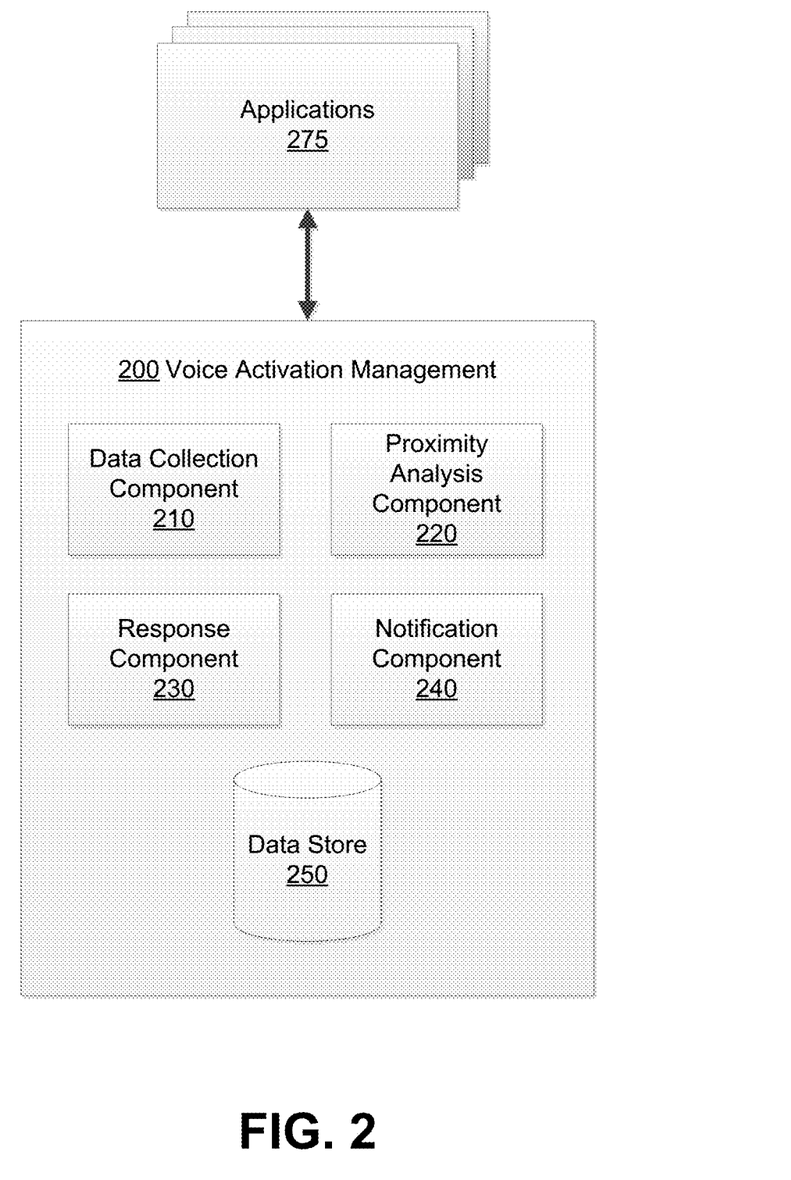
FIG. 2 is a block diagram of an example voice enabled system, in accordance with an embodiment.

In a networked environment, program modules depicted relative to computing environment 100, or portions thereof, may be stored in a remote memory storage device accessible via NIC 114. It will be appreciated that the network connections shown are exemplary and other means of establishing a communications link between the computers may be used. In an embodiment where computing environment 100 is configured to operate in a networked environment, the operating system is stored remotely on a network, and computing environment 100 may netboot this remotely-stored operating system rather than booting from a locally-stored operating system. In an embodiment, computing environment 100 comprises a thin client having an operating system that is less than a full operating system, but rather a kernel that is configured to handle networking and display output. FIG. 2 also shows proximity devices 120 which may include sensors and other devices that may provide data from which the proximity of a user may be determined.

Turning now to FIG. 2 is a block diagram illustrating an example voice activation management system 200 suitable for implementing user proximity determinations and device activations, in accordance with one or more embodiments. In an embodiment, system 200 may be implemented as a single computing device, such as computing environment 100 of FIG. 1. System 200 may take on any of a variety of forms. By way of example, system 100 may be a mobile telephone, smart phone, laptop computing device, desktop computing device, server, tablet computer, personal digital assistant (PDA), a wearable computer, a gaming device, or any other computing device.

In an embodiment, system 200 may be implemented by a single computing device, by multiple computing devices, such as computing environment 100 of FIG. 1, and in some embodiments at least one server component or a computing component accessed via a network connection (e.g., a cellular network, a WiFi/broadband network, a local area network, and the like). The at least one server component may comprise a single computing device or multiple computing devices cooperating in a distributed environment. For example, the at least one server component may be provided via multiple computing devices arranged in a distributed environment that collectively provide one or more of the functionalities described herein.

As shown by FIG. 2, system 200 includes such components as data collection component 210, proximity analysis component 220, response component 230, notifications component 240, and data store 250. Data collection component 210 may be generally responsible for receiving (acquiring, obtaining, or accessing) signals and/or data from one or more sources such as sensors. In an embodiment, the signals may be passive or active signals received by data collection component 210 and stored in one or more data stores, such as data store 250. The one or more data stores may thus be available to proximity analysis component 220, response component 230, and notification component 240.

Passive and active signals may be received from a variety of sources. By way of example, passive signals may include state data for a user's device, network connection data, application activity data, inertial data (e.g., accelerometer, gyroscopes, and magnetic field sensors), GPS data, and the like. In an embodiment, any type of existing signal is usable as a passive signal as long as it increases or decreases a likelihood of determining a state or proximity of one or more users. Device state data may include user interaction with the computing device, receiving tracking status events from a hardware offloaded (low power) tracking engine, and the like.

Network connection data may include information, such as whether the computing device is paired with a Bluetooth system, wireless access point connections, variations in a number of visible wireless access points (e.g., Wifi basic service set identifiers), signal strength measurements (e.g., received signal strength indicator values) associated with visible wireless access points, and the like. Application activity data may include information, such as whether a user is capturing image data with a camera of the computing device, credit card or other payment transactions completed with the computing device (e.g., an near field communication "NFC" tap), completion of a navigation session associated with a mapping application, receiving geo-fence events for geo-fences set by other applications (e.g., applications 275), and the like.

Passive signals may also include derived data. As another example of a raw system signal that can be used as a passive signal includes: "user is active on the device". In an embodiment, some derived signals may be a stronger indication that a computing device is in a stay state (the user is remaining in the room) than raw signals. As used herein, "derived data" refers to data indicative of a state of a computing device that is derived from other passive signals. For example, derived data may include position and velocity data associated with the computing device that is derived from GPS positions opportunistically obtained from unrelated applications (e.g., applications 275), system activity, and the like. As another example, derivative data may include inertial data derived based on recent location determinations.

By way of example, active signals may include data that is actively solicited, requested, or generated specifically for system 200.

Proximity analysis component 220 may be configured to determine scores (or metrics) for user states and positions based on the passive and active signals as well as other information. For example, proximity analysis component 220 may use as input statistical information associated with the passive and active signals. Furthermore, proximity analysis component 220 may determine scores determined for possible user states and positions. The score may indicate a likelihood that an actual state or position of a user actually corresponds to the determined state or position.

In an embodiment, a score may be expressed as a percentage, discrete enumeration (e.g., low, high, or unknown), or a combination. Examples of statistical information may include any combination of confidence scores, variance metrics, central tendency values, probability distribution functions, and the like. In determining a score for a user state or position, proximity analysis component 220 may receive one or more passive or active signals as input and provide the score for a determined user state or position as output. The passive or active signals may be received at any level of granularity including: continuously, periodically (e.g., every second, every minute, every ten minutes, etc.), or upon transitioning logic states (e.g., on to off, high to low, etc.).

Subject to design complexity and efficiency constraints, proximity analysis component 220 may utilize various functions to determine scores for a user state or position based on passive or active signals. In an embodiment, a score may be determined by taking a weighted average of individual passive or active signals. In an embodiment, a score may be determined in part using actively obtained signals indicative of a user state or position. In an embodiment, weights may be determined using training data obtained from data sets composed of previously-received passive or active signals. For example, a computing device may run in a test mode in which passive or active signals are collected along with GPS receiver signals providing verified states associated with the passive or active signals. That is, location data may be obtained every N minutes to obtain a ground truth that could be correlated with the passive or active signals to generate training data. In an embodiment, a score may be determined using a custom code implemented in a programming language of choice that defines relationships between individual passive or active signals and an actual state of the computing device.

In an embodiment, any known artificial intelligence, machine learning, knowledge-based, or rule-based mechanisms to train machine learned models that receive passive or active signals as input and provide a score for a user state or position as an output. Examples of such mechanisms include support vector machines, neural networks, expert systems, Bayesian belief networks, fuzzy logic, data fusion engines, classifiers, and the like. In training the machine learned models (e.g. find optimal values of for model parameters), objective functions may be used to measure the performance of the models using a subset of the training data as a function of the model parameters. For example, optimal values of the parameters of a model may be determined by finding a minimum of the objective function.

As another example, multiple iterations of a stochastic gradient descent procedure may be performed to find the optimal values of the parameters. In an embodiment, the machine learning model is composed of a single level of linear or non-linear operations. In an embodiment, the machine learning model is a deep network composed of multiple levels of non-linear operations. For example, the machine learning model may be a neural network with one or more hidden layers.

As an example, proximity analysis component 220 may determine a score for a user state or position using a logistic function. One skilled in the art will recognize that one property of logistic functions is that for any value of an input (i.e., independent variable) an output value is always within a range of [0,1], which makes logistic functions suitable for probabilistic applications. In this example, proximity analysis component 220 provides three (Boolean) passive signals as input to a logistic function. The three passive signals of this example are: (i) whether the user in the room ("room"); (ii) whether the user is stationary ("still"); and (iii) whether the user's computing device is paired with the Bluetooth system ("connected"). One skilled in the art will recognize that proximity analysis component 220 may provide a score based on dozen or even hundreds of passive or active signals. In an embodiment, passive or active signals may be categorized as categorical or continuous.

Proximity analysis component 220 in this example may provide the three passive signals into the following "user is near" state equation to determine a score for the "user is near" state:

$$P_{near}(\text{room, still, connected}) = \frac{1}{1 + e^{-(0.5*room + still + 1.2*connected)}} \quad \text{Equation 1}$$

The "user is near" state equation of this example demonstrates several things. First, in the absence of all three signals (i.e., room=0, still=0, connected=0), a score for the "user is near" state is 0.5. In this example, this 0.5 score for the near state may be used as an "indeterminate" threshold that indicates there is insufficient information available to determine that the user is in a "user is near" state.

Second, the "user is near" state equation of this example also demonstrates that some signals may increase the likelihood that the user is in a given state or location (i.e., a positive correlation exists), while other passive signals may decrease the likelihood that the user is in a given state or position (i.e., a negative correlation exists). Here, the "room" and "still" signals increase the likelihood that the user is in a "user is near" state. In contrast, another signal may decrease the likelihood that the user is in the "user is near" state because the user is potentially moving.

Third, individual signals may be weighted to reflect a signal's influence on the score relative to the other signals. Here, the "room" passive signal with a weight of 0.5 is a weaker indicator of the near state than the "still" passive signal with a weight of 1. Also, the "connected" signal with a weight of 1.2 is a stronger indication that the user is in a "user is near" state than the "still" passive signal with a weight of +1 that the user is in a near state.

Proximity analysis component 220 in this example would also provide the three passive signals into a "user is far" state equation to determine a score for the "user is far" state. For example, the "user is far" state equation may be as simple as:

$$P_{far}(\text{room,still,connected})=(1-P_{near})  \quad \text{Equation 2:}$$

In some instances as in this example, the "user is near" state equation and the "user is far" state equation may both return a low score, which indicates that the scores for the "user is near" state and "user is far" state have each failed to exceed their respective "indeterminate" thresholds. In these instances, system 200 may be unable to determine the current state of the user. For example, this may occur in situations with limited data availability. After a predetermined period of time in this uncertain state, system 200 may transition to an "unknown" state.

Response component 230 is generally configured to determine actions in response to the state or location of the user as determined by proximity analysis component 220 of system 200. Response component 230 may initiate a system action within a predefined time period. In an embodiment, the active operations may result in sending control signals to one or more subsystems of the voice activated device in order to enable or disable voice activation. The action implemented by response component 230 may further provide notifications to one or more other devices.

In an embodiment, system 200 may be configured to limit actions to certain types, such as only allowing notification operations, or allowing actions only for a limited set of states, in order to better control the responses to those that are appropriate for the circumstances or in accordance with the user's preferences.

As discussed above, user state or location determinations have an associated uncertainty. Response component 230 may modify system actions by categorizing actions based on state scores and probabilities. For example, response component 230 may specify an action for states associated with higher state scores when there is also a higher likelihood that active operations will result in confirming the computing device is in a "near" state.

As another example, response component 230 may specify an action for states associated with specified characteristics. By doing so, response component 230 may reserve a portion of the system action to states associated with locations that are more important for the user like the user's home or office. As another example, response component 230 may specify an action for states associated with lower state scores when there is a lower likelihood that active operations will result in confirming the user is in a near state.

In an embodiment, response component 230 may implement a hierarchy among the potential actions based on state scores, user preferences, probabilities, or a combination thereof. Using this hierarchy, response component 230 may facilitate actions based on various confidence levels.

In an embodiment, response component 230 may be further configured to dynamically adjust actions using user state information. Examples of such current system state information include whether the user's device is in an off state, whether the voice activate device has a display screen, characteristics of certain applications, etc.

Notification component 240 may be generally configured to provide one or more applications executing on the user's computing device with user state related notifications. In an embodiment, notification component 240 may be implemented using an application programming interface. In cooperation with proximity analysis component 220, notification component 240 may provide other applications with notifications upon determining the user has transitioned from one state to another. For example, notification component 240 may provide such notifications when the user has entered a near state, exited a near state, or stays in a near state. The notifications may include such information as the user's: current position, device status, number of other persons, and the like. In an embodiment, notification component 240 may issue notifications to applications upon determining that a state score exceeds a predetermined threshold (e.g., 0.7).

Figure 3:
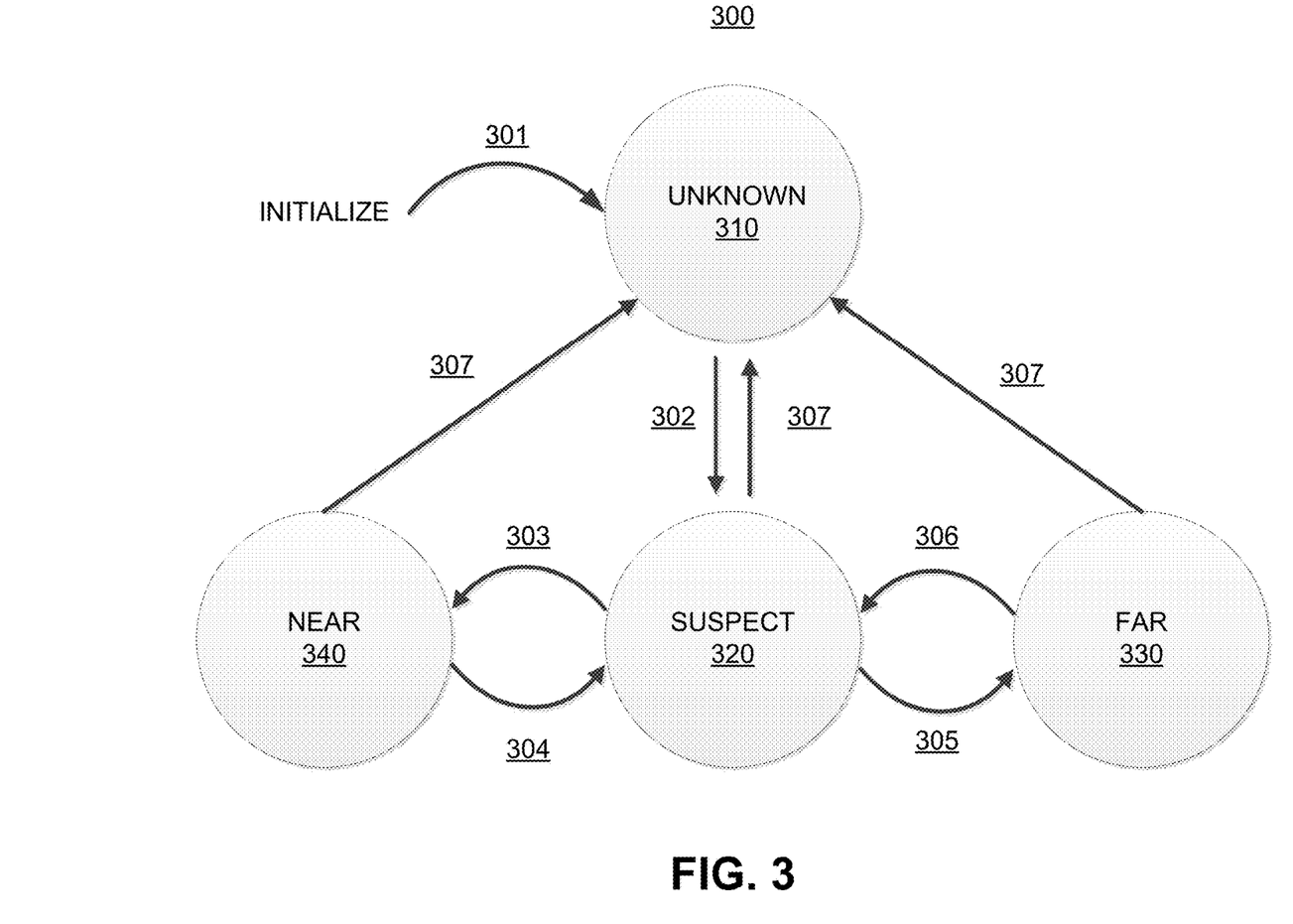
FIG. 3 is a state diagram showing modes of operation of an example computing system and example transitions between modes of operation, in accordance with an embodiment.

FIG. 3 shows a state diagram with four operation modes of an example user state determination system 300 that may be implemented. The four operation modes are an unknown mode 310, a suspect mode 320, a far mode 330, and a near mode 340. While this example illustrates four operation modes, it should be understood that FIG. 3 only illustrates one example, and that many operation modes or states may be implemented.

In the four operation modes, system 300 may continue to monitor passive or active signals to determine the user's current state. In one embodiment, in the unknown mode 310, system 300 may be mostly idle and does not cause any actions. As indicated by transition 307, system 300 may switch to the unknown mode 310 from any other operation mode when it is unable to determine a current state of the user from passive or active signals. System 300 may also operate in the unknown mode 310 when data is unavailable. One reason that data may be unavailable is system 300 lacks power, or is unable to access a network. When operating in the unknown mode 310, system 300 may periodically (e.g., "every few minutes" or when the passive or active signals start returning probability higher than "undetermined" for another state) switch to the suspect mode 320 to determine the current state, as shown by transition 302.

In suspect mode 320, system 300 may trigger operations to poll for the current state of the user (e.g., by polling a sensor, initiating Bluetooth scans, etc.). For example, if a location of the user has not been determined within a specified time, system 300 may poll for the current state while in suspect mode 320. In an embodiment, system 300 may trigger a subsequent active operation after a predefined time (e.g., 5 minutes) from a first polling operation to poll for data for the user.

If data obtained in suspect mode 320 indicates that the user is in a far state, system 300 follows transition 303 to far mode 330. Alternatively, if the data obtained in suspect mode 320 indicates the user is in a near state, system 300 follows transition 305 to near mode 340. As discussed above, system 300 may also follow transition 307 to unknown mode 310 for at least the reasons discussed above.

Figure 4:
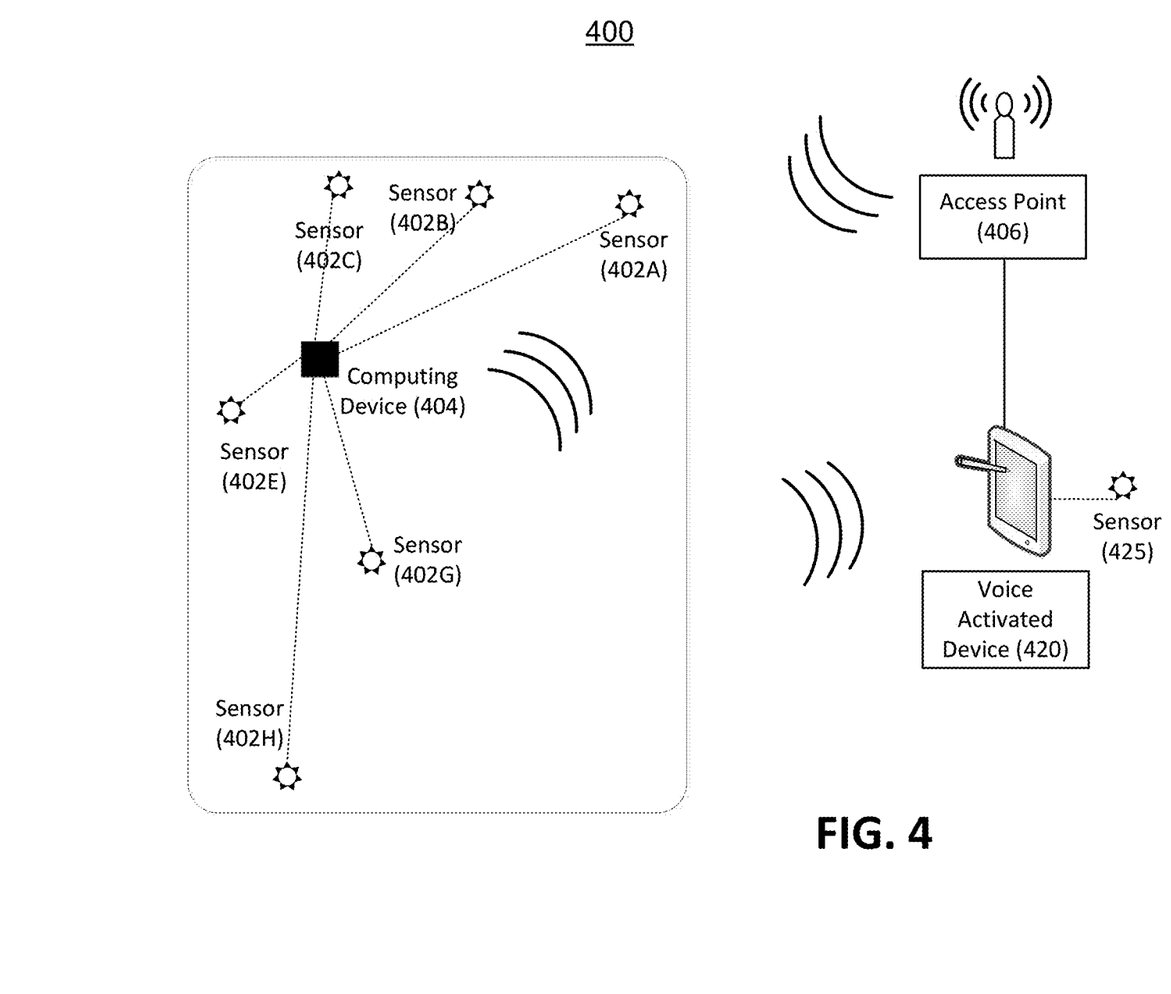
FIG. 4 is an illustration of system that may be used in various embodiments.

Turning to FIG. 4, an example of voice activation management system 400 is illustrated. The voice activation management system 400 may be configured to collect data associated with a user, analyze the collected data, perform one or more actions associated with the user and a voice activated device, and optionally send notifications to the computing device 420. In an embodiment, the voice activation management system 400 may include or have access to a number of sensors 402A-H (which may be referred herein singularly as "sensor 402" or in the plural as "sensors 402") connected to a computing device 404. The sensors 402 are configured to measure or otherwise obtain data indicative of various subsystems and components to the computing device 404, which in turn, processes and transmits information to and receives information from the computing device 420. FIG. 4 also shows that the voice activated device 420 may also have a sensor 425 that is installed on or coupled to the device.

Each of the sensors 402 and 425 may typically be installed in various locations in or near a home or other location proximate to the voice activated device. Although FIG. 2 shows six sensors 402 located in various positions, this number can be larger or smaller depending on the size and purpose of the voice activation management system 400.

The computing device 404 of the voice activation management system 400 may interface with the computing device 420 by way of the access point 406, which may be any wireless access point utilizing technologies such as cellular and Wifi. However, in an example, an intermediary device can also be used. The computing device 420 may be a smartphone, a tablet, or another computing device that is capable of communicating directly with the computing device 404 via, for example, Bluetooth, or communicate with access point 406 to communicate with computing device 404.

Various data can be measured with regard to the user's status. The sensor 402 can also be implemented as a virtual sensor that combines measurement and functionalities of the various types of sensors and devices. In other embodiments, the sensor 402 is an interface device can be a device that communicates with and obtains data from a sensor.

In one embodiment, the sensors 402 may be configured to transmit the measured data to the computing device 404, which may be configured to process the data. In some embodiments, the computing device 404 may not perform processing and may collect and transmit data to computing device 420, which may in turn execute functionality to process the received data.

In one embodiment, the computing device 404 may add time and location information to the processed data. The time may be measured by way of a clock operated by the computing device 404, while the location may be determined from the measured data or from a location sensor of the computing device 404 (e.g., circuitry that determines coordinates based on global positioning system (GPS), location triangulation techniques, etc.).

Moreover, the computing device 404 may correlate the data (e.g., the time and location stamped, labeled, and categorized data) with a particular detectable or identifiable user. For example, the computing device 404 can receive information that identifies the current user, or may be able to detect or infer the identity of the subject based on sensed data. Identity information can be provided by the computing device 420 or can be locally stored at the computing device 404. For example, the computing device 404 can add an identifier of the user (e.g., name) to the data to allow the computing device 420 to identify the user.

Figure 5:
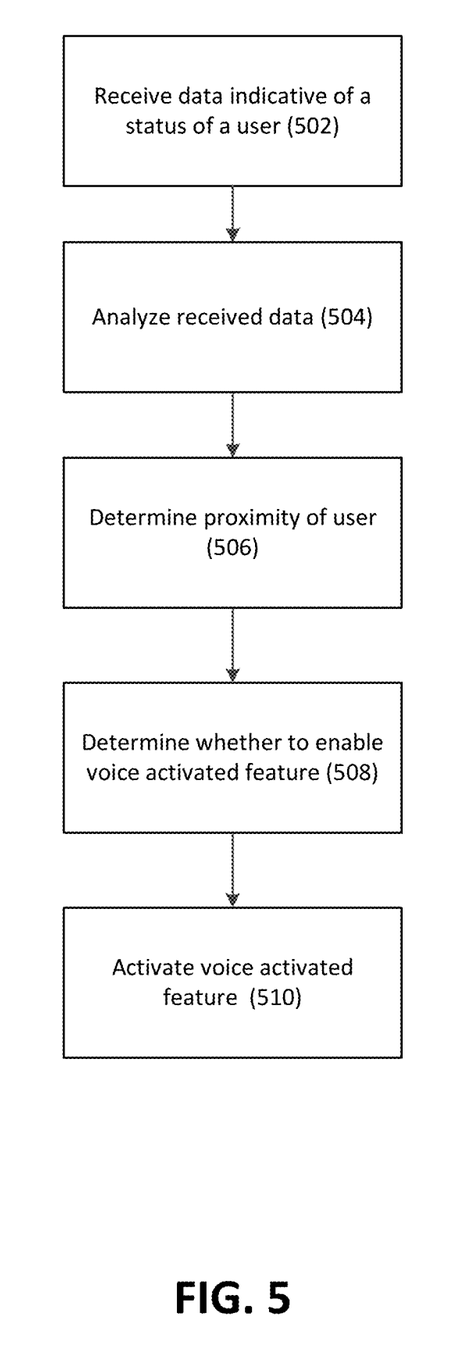
FIG. 5 is a flow diagram showing an example set of operations for enabling voice activated features based on proximity.

Turning to FIG. 5, an example operation for controlling a voice activated feature of a voice activated device is illustrated. Referring to FIG. 5, operation 502 illustrates receiving, by a voice activated device from one or more data sources, data indicative of a status of a user.

Operation 502 may be followed by operation 504. Operation 504 illustrates analyzing, by the voice activated device, the received data, and based on the analyzing, selecting a location with a highest probability among possible locations of the user.

Operation 504 may be followed by operation 506. Operation 506 illustrates determining a likely proximity of the user relative to a location of the voice activated device, the proximity determined based in part on availability of sensor and computing status information.

Operation 506 may be followed by operation 508. Operation 508 illustrates determining whether one or more voice activated features of the voice activated device should be enabled, based at least in part on the determined proximity, one or more rules, and one or more user preferences.

Operation 508 may be followed by operation 508. Operation 510 illustrates activating at least one of the voice activated features based on the determination.

In an embodiment, a method for controlling a voice activated feature of a voice activated device may be implemented. The method comprises:

receiving, by a voice activated device from one or more data sources, data indicative of a status of a user;

analyzing, by the voice activated device, the received data, and based on the analyzing, selecting a location with a highest probability among possible locations of the user;

determining a likely proximity of the user relative to a location of the voice activated device, the proximity determined based in part on availability of sensor and computing status information;

determining whether one or more voice activated features of the voice activated device should be enabled, based at least in part on the determined proximity, one or more rules, and one or more user preferences; and activating at least one of the voice activated features based on the determination.

In an embodiment, the data sources comprise sensors and a communicative network.

In an embodiment, the proximity of the user comprise a near state, far state, or an unknown state.

In an embodiment, the one or more rules a rule determines that one of the voice activated features should be enabled when the proximity is a specified distance to the voice activated device.

In an embodiment, the one or more rules determines that one of the voice activated features should be enabled when the proximity is a specified distance to the voice activated device and that the user is in a non-moving state.

In an embodiment, the data is further indicative of a state of a computing device associated with the user. In an embodiment, the state of a computing device indicates that the computing device is connected to a specified network.

In an embodiment, the method further comprises sending a notification to a computing device associated with the user, the notification indicative of the determination.

In an embodiment, the method further comprises deactivating the at least one voice activated feature based on a change to the determined proximity.

In an embodiment, the one or more user preferences comprises a time of day when the voice activated features can be enabled.

In an embodiment, the one or more user preferences comprises a location where the voice activated features can be enabled.

In an embodiment, the voice activated features are determined to be enabled based on a rule-based inference function that receives as input the data from the one or more sensors.

In an embodiment, a system may be implemented. The system comprises one or more processors that are configured to execute one or more executable instructions that cause the system to perform operations comprising:

receiving, from one or more data sources, data indicative of a status of a user;

determining, based on the received data, a proximity of the user relative to a location of a voice activated device, the determining further based on physical presence or absence of the user and computing activity or non-activity associated with the user; and enabling one or more voice activated features of the voice activated device, based at least in part on the determined proximity and one or more rules.

In an embodiment, the one or more processors are configured to execute one or more executable instructions that cause the system to perform operations comprising deactivating the at least one voice activated feature based on a change to the determined proximity.

In an embodiment, the one or more processors are configured to execute one or more executable instructions that cause the system to perform operations comprising sending a notification to a computing device associated with the user, the notification indicative of the enabled voice activation feature.

In an embodiment, the proximity of the user comprise a near state and a far state.

In an embodiment, the one or more rules determines that one of the voice activated features should be enabled when the proximity is a specified distance to the voice activated device.

In an embodiment, the voice enabled features are enabled based on a rule-based inference function that receives as input the data from the one or more sensors.

In an embodiment, the inference function is updated based on a learning function.

In an embodiment, a computing device may be implemented. The computing devices comprises at least one memory having stored therein computer instructions that, upon execution by one or more processors of the computing device, at least cause the computing device to:

analyze data received from one or more data sources comprising sensors, computing devices, or a combination, the data indicative of a status of a user;

based on the analyzing, determining a proximity of the user relative to a location of a voice activated device; and enabling one or more voice activated features of the voice activated device, based at least in part on the determined proximity and one or more criteria.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The techniques, or certain aspects or portions thereof, may, for example, take the form of program code (i.e., instructions) embodied in tangible storage media or memory media implemented as storage devices, such as magnetic or optical media, volatile or non-volatile media, such as RAM (e.g., SDRAM, DDR SDRAM, RDRAM, SRAM, etc.), ROM, etc., that may be included in computing devices or accessible by computing devices. When the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

It should be understood that the various techniques described herein may be implemented in connection with hardware or software or, where appropriate, with a combination of both. The subject matter presented herein may be implemented as a computer process, a computer-controlled apparatus or a computing system or an article of manufacture, such as a computer-readable storage medium. The terms "circuitry", "component", or "module" are used interchangeably throughout and include hardware components such as hardware interrupt controllers, hard drives, network adaptors, graphics processors, hardware based video/audio codecs, and the firmware used to operate such hardware. The terms "circuitry", "component", or "module" can also include microprocessors, application specific integrated circuits, and processors, e.g., cores of a multi-core general processing unit that perform the reading and executing of instructions, configured by firmware and/or software. Processor(s) can be configured by instructions loaded from memory, e.g., RAM, ROM, firmware, and/or mass storage, embodying logic operable to configure the processor to perform a function(s).

In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The previous description of the aspects is provided to enable a person skilled in the art to make or use the aspects. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed:

1. A method for controlling a voice activated feature of a voice activated device, the method comprising:
  receiving, by a voice activated device from one or more data sources, data indicative of a status of a user, the data including sensor and computing status information;
  analyzing, by the voice activated device, the received data;
  based on the analyzing, selecting a location of the user with a highest probability among probabilities for locations of the user;
  determining a proximity of the user relative to a location of the voice activated device, the proximity including a specified radius from the voice activated device, the proximity determined based in part on one or more of:
    the selected location of the user and the data indicative of the status of the user;
    a time period when voice activation is to be in effect; or
    an inferred presence status of the user that is based on one or more of:
      monitored signals of the user's computing device, other computing devices, and sensors that are communicatively coupled to the voice activated device;
      secondary information including one or more of a presence of the user's mobile device, activity or non-activity of the user's mobile device, state of the user's mobile device, and a status of a Bluetooth connection of the user's mobile device;
      sensor information including one or more of light patterns and movement patterns; or
      location data generated by applications on the computing device and other computing devices;
  wherein the determined proximity has an associated uncertainty indicated by a score that quantifies a likelihood that the determined proximity represents an actual state of the user;
  disabling the voice activated device from responding to a voice command when an option to turn off voice activation is selected; and
  enabling the voice activated device to respond to a voice command based at least in part on the determined proximity, one or more rules usable to determine whether the voice activated device should respond to the voice command based on the determined proximity, and one or more user preferences indicative of a time or location when the voice activated device should be enabled.

2. The method of claim 1, wherein the data sources comprise sensors and a communicative network.

3. The method of claim 1, wherein the proximity of the user comprises a near state, far state, or an unknown state.

4. The method of claim 1, wherein the one or more rules determines that one of the voice activated features should be enabled when the proximity is a specified distance to the voice activated device.

5. The method of claim 1, wherein the one or more rules determines that one of the voice activated features should be enabled when the proximity is a specified distance to the voice activated device and that the user is in a non-moving state.

6. The method of claim 1, wherein the data is further indicative of a state of a computing device associated with the user.

7. The method of claim 6, wherein the state of a computing device indicates that the computing device is connected to a specified network.

8. The method of claim 1, further comprising sending a notification to a computing device associated with the user, the notification indicative of a determination.

9. The method of claim 1, further comprising deactivating at least one voice activated feature based on a change of the determined proximity.

10. The method of claim 1, wherein the one or more user preferences comprises a time of day when the voice activated features can be enabled.

11. The method of claim 1, wherein the one or more user preferences comprises a location where the voice activated features can be enabled.

12. The method of claim 1, wherein the voice activated features are determined to be enabled based on a rule-based inference function that receives as input the data from the one or more data sources.

13. A system comprising one or more processors that are configured to execute one or more executable instructions that cause the system to perform operations comprising:
  receiving, from one or more data sources, data indicative of a status of a user, the data including sensor and computing status information;
  determining, based on the received data, a proximity of the user relative to a location of a voice activated device, the proximity including a specified radius from the voice activated device, the determining further based on one or more of:
  a location of the user with a highest probability among probabilities for locations of the user;
    the location of the user and the data indicative of the status of the user;
    a time period when voice activation is to be in effect; or
    an inferred presence status of the user that is based on one or more of:
      monitored signals of the user's computing device, other computing devices, and sensors that are communicatively coupled to the voice activated device;
      secondary information including one or more of a presence of the user's mobile device, activity or non-activity of user's, state of the user's mobile device, and a status of a Bluetooth connection of the user's mobile device;

sensor information including one or more of light patterns and movement patterns; or location data generated by applications on the computing device and other computing devices;

wherein the determined proximity has an associated uncertainty indicated by a score that quantifies a likelihood that the determined proximity represents an actual state of the user;

disabling the voice activated device from responding to a voice command when an option to turn off voice activation is selected; and enabling the voice activated device to respond to a voice command, based at least in part on the determined proximity and one or more rules usable to determine whether the voice activated device should respond to the voice command based on the determined proximity.

14. The system of claim 13, wherein the one or more processors are configured to execute one or more executable instructions that cause the system to perform operations comprising deactivating at least one voice activated feature based on a change to the determined proximity.

15. The system of claim 13, wherein the one or more processors are configured to execute one or more executable instructions that cause the system to perform operations comprising sending a notification to a computing device associated with the user, the notification indicative of the enabled voice activation feature.

16. The system of claim 15, wherein the proximity of the user comprises a near state and a far state.

17. The system of claim 13, wherein the one or more rules determines that one of the voice activated features should be enabled when the proximity is a specified distance to the voice activated device.

18. The system of claim 13, wherein the voice enabled features are enabled based on a rule-based inference function that receives as input the data from the one or more data sources.

19. The system of claim 18, wherein the inference function is updated based on a learning function.

20. A computing device comprising at least one memory having stored therein computer instructions that, upon execution by one or more processors of the computing device, at least cause the computing device to:

analyze data received from one or more data sources comprising sensors, computing devices, or a combination, the data indicative of a status of a user, the data including sensor and computing status;

based on the analyzing and a location of the user with a highest probability among probabilities for locations of the user, determining a proximity of the user relative to a location of a voice activated device, the proximity including a specified radius from the voice activated device, the proximity determined based in part on one or more of:

the location of the user and the data indicative of the status of the user;

a time period when voice activation is to be in effect; or an inferred presence status of the user that is based on one or more of:

monitored signals of the user's computing device, other computing devices, and sensors that are communicatively coupled to the voice activated device;

secondary information including one or more of a presence of the user's mobile device, activity or non-activity of the user's mobile device, state of the user's mobile device, and a status of a Bluetooth connection of the user's mobile device;

sensor information including one or more of light patterns and movement patterns; or location data generated by applications on the computing device and other computing devices;

wherein the determined proximity has an associated uncertainty indicated by a score that quantifies a likelihood that the determined proximity represents an actual state of the user;

disabling the voice activated device from responding to a voice command when an option to turn off voice activation is selected; and enabling one or more voice activated features of the voice activated device, based at least in part on the determined proximity and one or more criteria.

* * * * *